United States Patent
Stephan

(10) Patent No.: US 9,718,337 B2
(45) Date of Patent: Aug. 1, 2017

(54) SEALING ARRANGEMENT FOR A MOVABLE WINDOW PANE

(71) Applicant: Ford Global Technologies, LLC, Dearborn, MI (US)

(72) Inventor: Joerg Stephan, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/097,573

(22) Filed: Apr. 13, 2016

(65) Prior Publication Data
US 2016/0318383 A1    Nov. 3, 2016

(30) Foreign Application Priority Data

Apr. 28, 2015  (DE) .................. 10 2015 207 817

(51) Int. Cl.
  E06B 7/16  (2006.01)
  B60J 10/76  (2016.01)
(52) U.S. Cl.
  CPC .................... B60J 10/76 (2016.02)
(58) Field of Classification Search
  CPC .................... B60J 10/25; E06B 7/22
  USPC ..................... 49/440, 441, 495.1
  See application file for complete search history.

(56) References Cited

U.S. PATENT DOCUMENTS

| | | | | |
|---|---|---|---|---|
| 2,737,412 A * | 3/1956 | Smith | ..................... | B62D 25/06 49/479.1 |
| 3,164,870 A * | 1/1965 | Stolarczyk | ............... | B60J 10/84 49/495.1 |
| 4,455,785 A * | 6/1984 | Wahr | ..................... | B60J 10/248 49/498.1 |
| 4,584,793 A * | 4/1986 | Okada | ..................... | B60J 10/80 49/484.1 |
| 5,016,394 A * | 5/1991 | Iida | ......................... | B60J 10/24 49/441 |
| 5,054,241 A * | 10/1991 | Mishima | ............... | E06B 7/2312 49/490.1 |
| 5,209,019 A * | 5/1993 | Morita | ................... | B60J 10/248 49/475.1 |
| 5,217,786 A * | 6/1993 | Keys | ....................... | B60J 10/79 428/122 |
| 5,319,883 A * | 6/1994 | Gueneau | .................. | B60J 10/79 49/441 |

(Continued)

FOREIGN PATENT DOCUMENTS

DE    102006028051 A1    12/2007
EP         0456952 A1    11/1991

*Primary Examiner* — Jerry Redman
(74) *Attorney, Agent, or Firm* — Jason Rogers; Price Heneveld LLP

(57) ABSTRACT

A sealing arrangement for a movable window pane in a vehicle door provides a rain channel. The sealing arrangement including a base body which has a receiving region for an edge region of the window pane including projections which oppose one another in the receiving region and having a first projection which extends from the outer projection of the opposing projections from a connecting point into the receiving region and in the closed state of the window pane bears against an outer face of the window pane. A second projection on the outer projection of the opposing projections extends outwardly from the connecting point in order to form a rain channel.

18 Claims, 1 Drawing Sheet

(56) References Cited

U.S. PATENT DOCUMENTS

| | | | | |
|---|---|---|---|---|
| 8,595,982 B2* | 12/2013 | Matsuura | ............ | E06B 3/42 49/441 |
| 8,689,489 B2* | 4/2014 | Mine | ............ | B60J 10/76 49/441 |
| 8,869,456 B2* | 10/2014 | Matsuura | ............ | E06B 7/22 49/489.1 |
| 2007/0006534 A1* | 1/2007 | Hiramatsu | ............ | B60J 10/21 49/414 |
| 2007/0251152 A1* | 11/2007 | Takase | ............ | B60J 10/74 49/441 |
| 2007/0271853 A1* | 11/2007 | Yatsuda | ............ | B60J 10/74 49/489.1 |
| 2009/0108625 A1* | 4/2009 | Minami | ............ | B60J 10/277 296/146.2 |

* cited by examiner

SEALING ARRANGEMENT FOR A MOVABLE WINDOW PANE

FIELD OF THE INVENTION

The present invention generally relates to a sealing arrangement for a window pane in a vehicle body, and more particularly for a window pane which is movably arranged in a vehicle door.

BACKGROUND OF THE INVENTION

Automotive vehicles are commonly equipped with movable window panes arranged with a vehicle body, particularly the vehicle doors. The window panes are sealed closed with a sealing arrangement typically having a base body which has a receiving region for an edge region of the window pane including projections which oppose one another in the receiving region and including a first projection which extends from the outer projection of the opposing projections from a connecting point into the receiving region and in the closed state of the window pane bears against an outer face of the window pane. Such a generic sealing arrangement for a window pane is disclosed in DE 10 2006 028 051 B4.

It is also generally known to provide window panes of motor vehicle doors with rain-shielding elements, so that the window panes may be opened at least partially in spite of rain, without rain penetrating the vehicle interior, for example by running off the roof. EP 0 456 952 A1 discloses one example of a rain shield which may be bonded to the upper edge region of the door, the window pane, etc. However, this method is undesirable and also not visually acceptable. It would be desirable to provide for an enhanced sealing arrangement that offers a possibility of preventing the ingress of rain through a partially open window pane of a motor vehicle.

SUMMARY OF THE INVENTION

According to one aspect of the present invention, a sealing arrangement for a window pane movably arranged in a vehicle door is provided. The sealing arrangement includes a base body having a receiving region for an edge region of the window pane and inner and outer projections which oppose one another in the receiving region. The sealing arrangement also includes a first projection which extends from the outer projection of the opposing projections from a connecting point into the receiving region and in the closed state of the window pane bears against an outer face of the window pane. The sealing arrangement further includes a second projection on the outer projection of the opposing projections extending outwardly from the connecting point.

According to another aspect of the present invention, a sealing arrangement for a movable window pane is provided. The sealing arrangement includes a base body having opposing inner and outer projections in a receiving region for receiving the window pane. The sealing arrangement also includes a first projection extending from the outer projection from a connecting point into the receiving region and in the closed state of the window pane bearing against an outer face of the window pane. The sealing arrangement further includes a second projection on the outer projection extending outwardly from the connecting point.

These and other aspects, objects, and features of the present invention will be understood and appreciated by those skilled in the art upon studying the following specification, claims, and appended drawings.

DETAILED DESCRIPTION OF THE PREFERRED EMBODIMENTS

The present illustrated embodiments preside primarily in a sealing arrangement for a window pane in a vehicle body. In the embodiment shown, the window pane is movably arranged in a vehicle body. The sealing assembly includes a base having a receiving region for receiving an edge region of the window pane and includes inner and outer projections which oppose one another in the receiving region. The sealing arrangement includes a first projection which extends from the outer projection of the opposing projections from a connecting point into the receiving region and in the closed state of the window pane bears against an outer face of the window pane. The sealing arrangement further includes a second projection on the outer projection of the opposing projections extending outwardly from the connecting point. The second projection may serve as a rain shield, as in the manner of a rain channel to prevent the ingress of water from above the window pane, in particular from the vehicle roof, when the window pane is open. The length of the second projection is variable depending on requirements but generally it will be longer than that of the first projection.

In the embodiment shown and described herein, in the open state of the window pane the first projection protrudes into the receiving region such that the first projection comes into contact with the upper edge region of the window pane when the window pane is inserted and thus effects a pivoting movement of the first and second projections about the connecting point. The first projection thus acts as a sealing element and at the same time effectively acts as a pivot lever which also effects the movement of the second projection in the manner of a hinge about the connecting point. Thus, the first and second projections are able to be pivoted together about the connecting point.

For improving the seal and at the same time for shortening the pivoting path, the second projection may have on its outer end a thickened portion oriented in the direction of the window pane, which then bears against the window pane in the closed state affecting the seal. For improving the rain channel function the second projection may have a convex shape (oriented outwardly).

Also, in the closed state of the window pane the second projection may bear against an outer face of the window pane. Thus, in the closed state both projections bear externally against the window pane and affect the desired labyrinth seal. In order to improve the pivoting movement of the projections, it is expedient if the connecting point has a narrowed portion oriented toward the receiving region.

Figure 1:
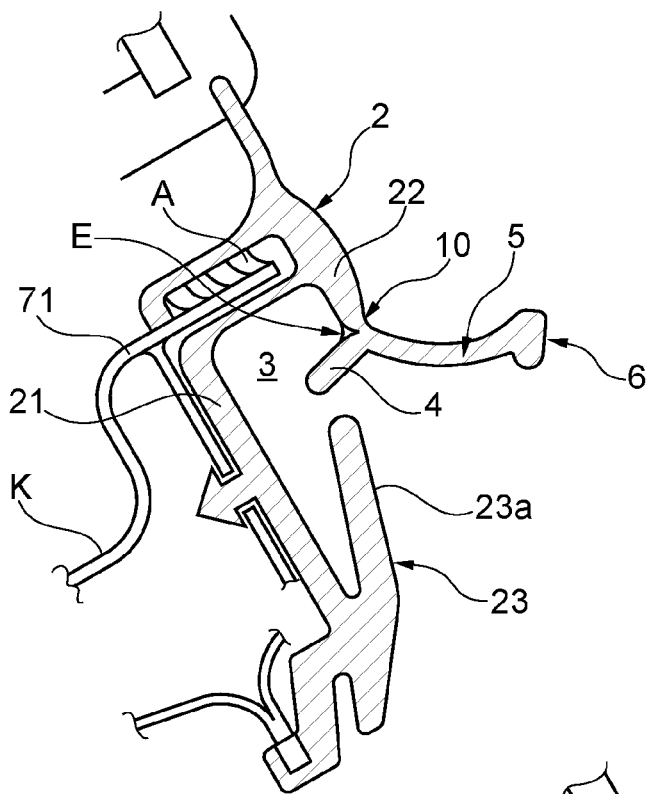
FIG. 1 is a schematic view of a section of a sealing arrangement through the upper edge region of a vehicle door of a passenger motor vehicle shown in the open position of a window pane.
Figure 2:
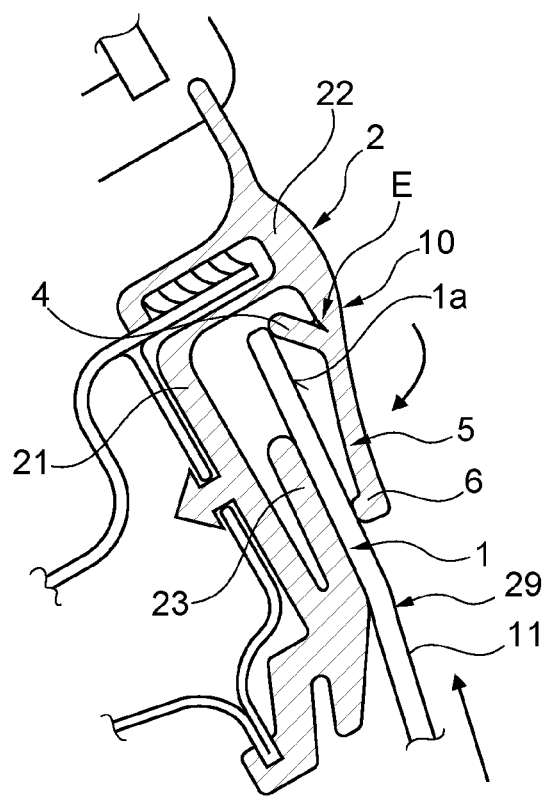
FIG. 2 is a schematic view of the section of the sealing arrangement through the upper edge region of a vehicle door of FIG. 1 shown in the closed position of the window pane.

The sealing arrangement is shown, according to one embodiment in the FIGS. 1 and 2 having a base body 2, which has a receiving region 3 for receiving a window pane 1. The receiving region 3 in this case is formed by a substantially U-shaped partial region of the base body 2 in sectional view, wherein to this end the base body 2 includes an inner projection 21 and an outer projection 22. The inner and outer projections 21 and 22 have different dimensions and shapes in the exemplary embodiment.

A first projection 4 extends from the outer projection 22 of the opposing projections 22 from a narrowed connecting point 10 into the receiving region 3 and bears against an outer face 11 of the window pane 1 in the closed state of the window pane 1 as illustrated in FIG. 2. A second projection 5 also extends on the outer projection 22 of the opposing projections 22 from the connecting point 10, but extends outwardly. The first and second projections 4, 5 are configured to be pivoted together about the connecting point 10.

In the open state of the window pane as illustrated in FIG. 1, the first projection 4 protrudes into the receiving region 3 such that the first projection 4 comes into contact with the upper edge region 1a of the window pane 1 when the window pane 1 is inserted and thus effects a pivoting movement of the first and second projections 4, 5 about the connecting point 10. Thus, both projections 4, 5 in the closed state of the window pane 1 as shown in FIG. 2 bear against the outer face 11 of window pane 1 as a labyrinth seal. To this end, the second projection 5 includes a thickened portion 6 on its outer end oriented in the direction of the window pane 1.

The connecting point 10 has a narrowed portion E oriented toward the receiving region 3 in order to simplify the movement of the two projections 4, 5. The second projection 5 has a convex shape so that it more effectively fulfills its function as a rain channel by conducting water in the recess formed by the convex shape.

The sealing arrangement and, in particular, the base body 2 also have, as described in DE 10 2006 028 051 B4, a bulged sealing element 23 which bears with its upper surface 23a against an inner face of the window pane 1 when the window pane is inserted into the closed state.

A further receiving region A is configured in the base body 2. A bodywork flange K of the vehicle door is shown received in the receiving region A. In the embodiment shown, this bodywork flange K includes an opening-out region 71 which penetrates the receiving region A and is sealed.

Accordingly, the sealing arrangement advantageously provides for a first projection and a second projection that extends outwardly from the connecting point to serve as a rain shield or channel to prevent the ingress of water above the movable window pane within a vehicle door when the window pane is open. The sealing structure advantageously pivots due to movement of the first and second projections about the connecting point as the window pane moves from the closed to open position. It should be appreciated that the sealing arrangement may likewise be useful for a movable window pane arranged in other structures.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A sealing arrangement for a window pane movably arranged in a vehicle door, comprising:
    a base body having a receiving region for an edge region of the window pane;
    inner and outer projections which oppose one another in the receiving region;
    a first projection which extends from the outer projection of the opposing inner and outer projections from a connecting point into the receiving region and in a closed state of the window pane bears against an outer face of the window pane; and
    a second projection on the outer projection of the opposing projections extending outwardly from the connecting point, wherein the second projection has a convex shape that forms a recess to form a rain channel when the window pane is in an open state, wherein the second projection has a first end connected to the first projection and a second end extending outward and forming the convex shape, and as the window pane moves between the closed state and the open state, the window pane contacts the first projection which pivots the second projection from the convex shape forming the rain channel to a position which bears against the outer face of the window pane.

2. The sealing arrangement as claimed in claim 1, wherein in the open state of the window pane the first projection protrudes into the receiving region such that the first projection comes into contact with an upper edge region of the window pane when the window pane is inserted and thus effects a pivoting movement of the first and second projections about the connecting point.

3. The sealing arrangement as claimed in claim 1, wherein the second projection has on an outer end a thickened portion oriented in a direction of the window pane.

4. The sealing arrangement as claimed in claim 1, wherein in the closed state of the window pane the second projection bears against an outer face of the window pane.

5. The sealing arrangement as claimed in claim 1, wherein the connecting point has a narrowed portion oriented toward the receiving region.

6. The sealing arrangement as claimed in claim 1, wherein the first and second projections are configured to be pivoted together about the connecting point, and wherein the first and second projections bear externally against the outer face of the window pane in the closed state.

7. A sealing arrangement for a movable window pane, comprising:
    a base body having opposing inner and outer projections in a receiving region for receiving the window pane;
    a first projection extending from the outer projection from a connecting point into the receiving region and in a closed state of the window pane bearing against an outer face of the window pane; and
    a second projection on the outer projection extending outwardly from the connecting point to form a rain channel when the window pane is in an open state, wherein the second projection has a first end connected to the first projection and a second end extending outward and forming the convex shape, and as the window pane moves between the closed state and the open state, the window pane contacts the first projection which pivots the second projection from the convex shape forming the rain channel to a position which bears against the outer face of the window pane.

8. The sealing arrangement as claimed in claim 7, wherein in the open state of the window pane the first projection protrudes into the receiving region such that the first projection comes into contact with the upper edge region of the window pane when the window pane is inserted and thus effects a pivoting movement of the first and second projections about the connecting point.

9. The sealing arrangement as claimed in claim 7, wherein the second projection has on an outer end a thickened portion oriented in a direction of the window pane.

10. The sealing arrangement as claimed in claim 7, wherein the second projection has a convex shape that forms a recess for the rain channel.

11. The sealing arrangement as claimed in claim 7, wherein in the closed state of the window pane the second projection bears against an outer face of the window pane.

12. The sealing arrangement as claimed in claim 7, wherein the connecting point has a narrowed portion oriented toward the receiving region.

13. The sealing arrangement as claimed in claim 7, wherein the first and second projections are configured to be pivoted together about the connecting point, wherein the first and second projections bear externally against the outer face of the window pane in the closed state.

14. The sealing arrangement as claimed in claim 7, wherein the movable window pane is arranged in a vehicle door.

15. A sealing arrangement for a movable window pane, comprising:
   a base body having an outer projection and a receiving region for receiving the window pane;
   a first projection extending from the outer projection from a connecting point into the receiving region; and
   a second projection on the outer projection extending outwardly from the connecting point, wherein the first and second projections bear against an outer face of the window pane in the closed state, wherein the second projection has a first end connected to the first projection and a second end extending outward and forming a convex shape to form a rain channel when the window pane is in an open state, and as the window pane moves between the closed state and the open state, the window pane contacts the first projection which pivots the second projection from the convex shape forming the rain channel to a position which bears against the outer face of the window pane.

16. The sealing arrangement of claim 15, wherein the second projection forms a recess that forms the rain channel.

17. The sealing arrangement of claim 15, wherein in an open state of the window pane the first projection protrudes into the receiving region such that the first projection comes into contact with the upper edge region of the window pane when the window pane is inserted and thus effects a pivoting movement of the first and second projections about the connecting point.

18. The sealing arrangement as claimed in claim 15, wherein the second projection has on an outer end a thickened portion oriented in a direction of the window pane.

* * * * *